Sept. 11, 1962 A. JACOBY 3,054,098
ROTATIONAL SHAFT ENCODER
Filed July 16, 1958 2 Sheets-Sheet 1
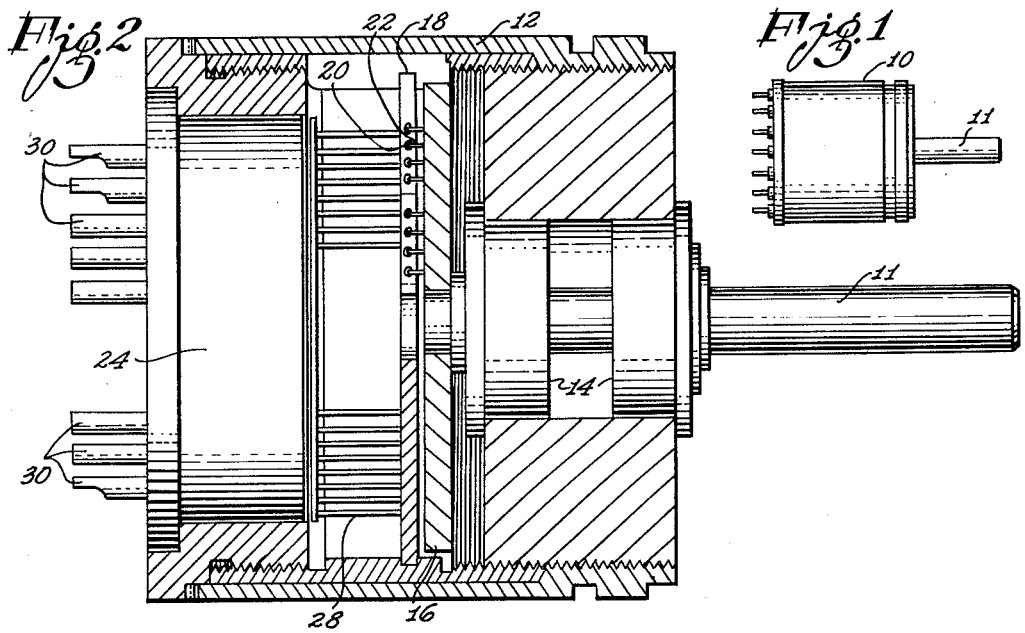
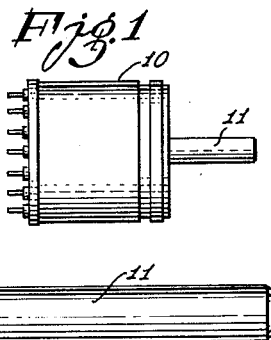
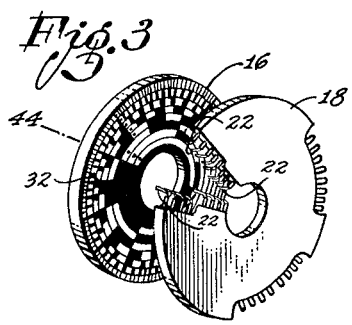
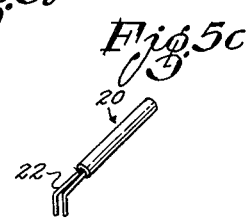
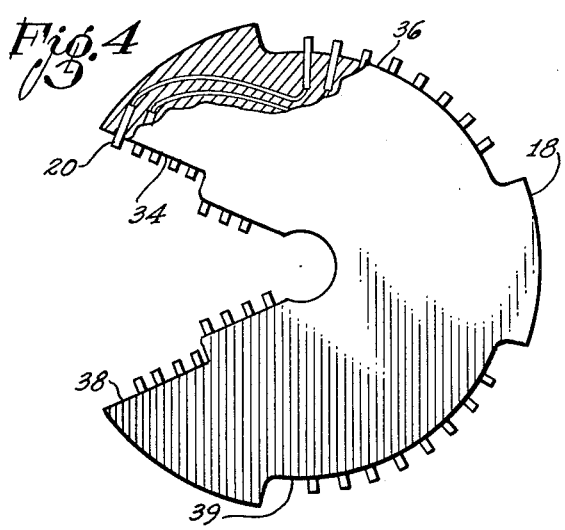
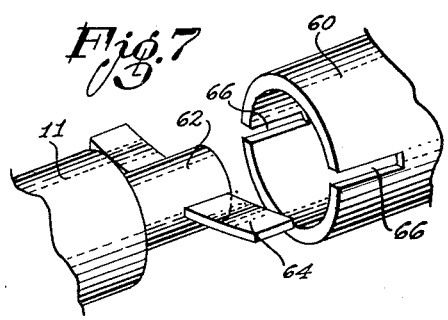
INVENTOR:
Abraham Jacoby
By Richard K. Ehrlich
Attorney.

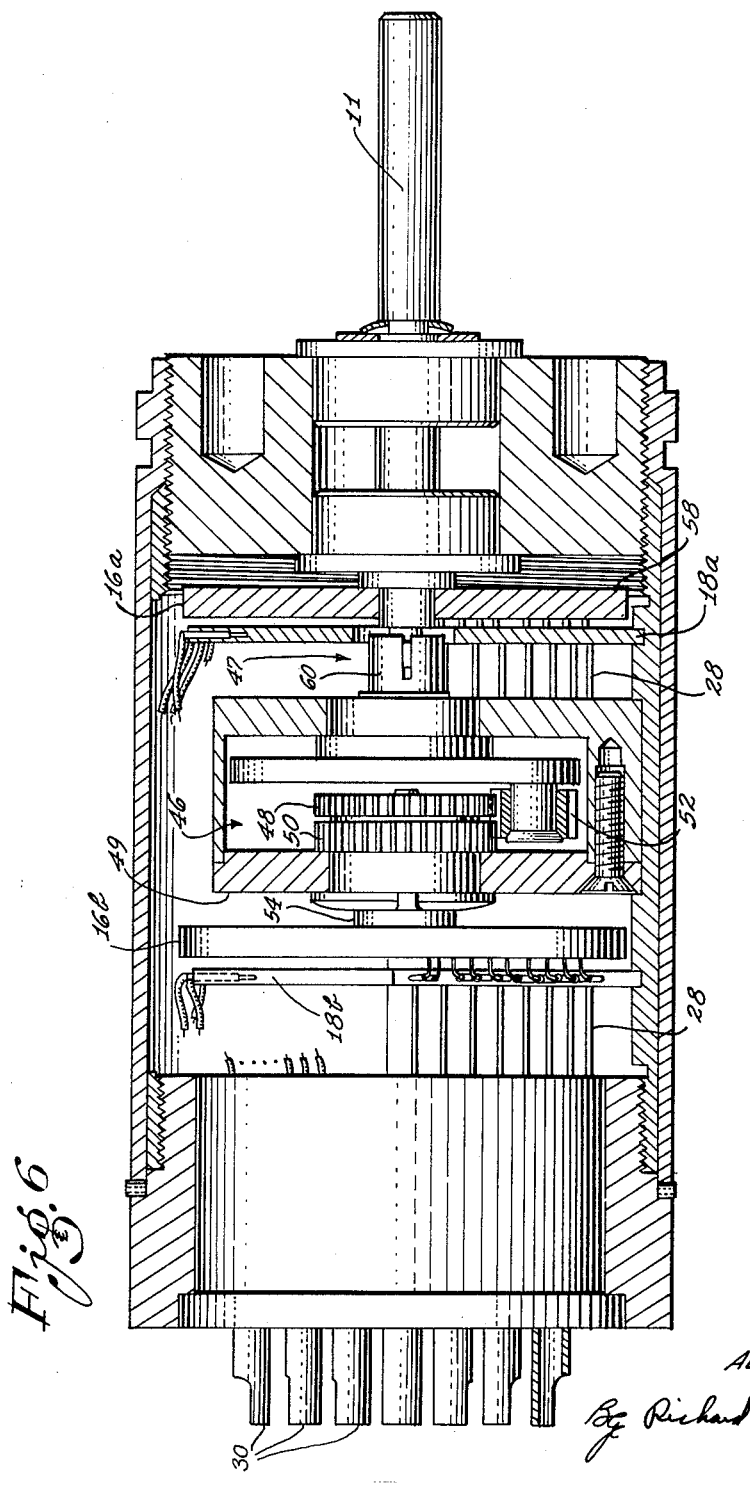

United States Patent Office 3,054,098
Patented Sept. 11, 1962

3,054,098
ROTATIONAL SHAFT ENCODER
Abraham Jacoby, Los Angeles, Calif., assignor, by mesne assignments, to Litton Systems, Inc., Beverly Hills, Calif., a corporation of Maryland
Filed July 16, 1958, Ser. No. 748,991
3 Claims. (Cl. 340—347)

The present invention relates to an improved rotational analog-to-digital converter, and more particularly to an improved rotational analog-to-digital converter employing contact brushes for converting a shaft position into a digital number representative of the shaft position.

Since the end of World War II, numerous extensive experiments in many fields, such as aero-dynamics and nuclear energy have been conducted. Automatic recording instruments of various types are used to record vast amounts of raw data obtained from these experiments. However, to make use of this raw data, it is generally necessary to perform certain mathematical operations thereon. This process of reducing the data from the form generated by the instruments used in the experiments to a form indicating a useful experimental result is extremely laborious and time consuming, if not impossible to perform by hand, and therefore, this process of data reduction is ideally suited for being performed by automatic digital computers. However, in order to utilize automatic digital computers for this purpose, it is first necessary to translate the analog signals from the recording instruments to a digital form.

In the prior art, a number of different schemes have been devised for converting analog signals to digital form. However, most of the schemes can be characterized as being one of two major types depending upon whether a physical analog signal such as a shaft rotation is used or whether an electrical voltage analog signal is used. It is well known to those skilled in the art, that an analog signal in the form of shaft rotation can be transformed to digital form at a higher rate of speed than an analog signal in the form of an electrical voltage. Furthermore, a higher degree of accuracy can be achieved when transforming a shaft rotation to digital form than when transforming an electrical voltage to digital form. Hence, it is desirable in most applications to utilize a shaft rotation rather than an electrical voltage as the analog signal.

In the prior art, an analog signal in the form of shaft rotation is converted to a digital signal by means of a rotational input encoder. Basically, these encoders include a rotating encoder disk having a separate annular track for each binary digit of the digital number to be represented. Each annular track includes separate segments or areas which are representative of the value of the binary digit represented by the particular annular track. In the majority of encoders the areas comprising the annular rings are either electrically conductive or non-conductive, so that when a conductive contact brush is placed in contact with one of the annular rings on the encoder disk an electrical current will flow through the brush whenever a conductive area passes under the brush. In this manner, the value of each digit of the binary number which is representative of the shaft position is determined and by connecting an electrical conductor to each of the brushes, the binary number can be applied to a digital computer, or other apparatus.

It should be herein noted that in the prior art a few encoders have been mechanized by providing transparent and opaque areas instead of conductive and non-conductive areas, a lamp and a photo-electric cell being used to sense the areas and thereby determine the value of the corresponding digit. This type of system, however, is considerably more complicated than a brush encoder system, and therefore, is much more likely to break down.

In general, each photo cell requires an amplifier and an amplifier discriminator, and if a flash lamp is used, the encoder requires, in addition, a high-voltage power supply. It is evident to one skilled in the art, that any one of these elements is susceptible to failure and that any such failure would render the encoder useless. Also, the optical encoder is susceptible to errors from dirt particles which accumulate on the face of the encoder disk, while such dirt particles would be pushed aside by the brushes in a contact brush encoder. Because of the foregoing reasons, photo-electric encoders are relatively unpopular in the prior art.

Since there must be a separate annular ring for each binary digit of the number to be converted into digital form, a large number of rings are required on an encoder disk which is utilizable for generating a digital number of any magnitude. However, it has been found that the small dimensional tolerances allowable in encoder disk manufacture makes it extremely difficult to manufacture a reasonably sized disk having a large number of annular rings. In order to avoid this manufacturing problem analog-to-digital converters have been mechanized which utilize two encoder disks which move through different angular amounts in response to the same magnitude input shaft rotation, or in other words, the two shafts move at different speeds. It is evident that some type of input gearing is necessary to accomplish this result. The input gearing systems which have been used in prior art encoders, however, are sizable and expensive.

In prior art encoders, it has been impossible to use compact gearing apparatus such as a planetary differential gear train since slight misalignment between the axis of the rotatable input shaft of the encoder and the output shaft of the gear train causes the gear train to bind. This is true since a planetary gear which must be coupled to the rotatable input shaft will not mesh properly with the other gears in the gear train whenever there is even a relatively small amount of misalignment between the aforementioned shafts. Because of this improper meshing, the planetary gear tends to bind and in some cases even damage the other gears in the train.

In addition, as stated at page 6.4111 of "Analog-Digital Conversions Techniques," published by the Massachusetts Institute of Technology in 1956, ordinary pin-and-dog couplings are not adequate for intercoupling the encoder disk shafts, the gear train and the rotatable input shaft since relatively small shaft misalignments will cause a substantial angular error. For example, shaft misalignment of $\frac{1}{10000}$ths of an inch with an ordinary pin-and-dog coupling results in an angular error of 20 seconds in shaft position. It is evident to those skilled in the art, that an angular error of this magnitude cannot be tolerated A more suitable type of coupling has been developed by the Ferrand Optical Co. and is described at page 6.43 of the herein cited reference. This type of coupling, however, occupies a relatively large amount of space and therefore, is not suitable for use in an encoder whose physical size is limited by the circumstances of its application. For example, very small encoders are desired for use with airborne guidance systems.

While, as hereinbefore mentioned, contact brush rotational encoders are superior to other forms of rotational encoders, the prior art contact brush encoders still have several serious limitations. Firstly, contact brush encoders of the prior art have a relatively short life, the major cause of this short life being found in brush wear.

In examining brush wear of prior art encoders, it should be noted that prior art brushes are relatively large so that it is necessary that the brush be held against the surface of an encoder disk with a relatively large amount of force so that the brush will not momentarily bounce off the surface of the disk when it is rotated at high speeds. The relatively large force which is used to hold the brush in contact with the disk causes the frictional force generated at the surface of the disk and the brush to be large, and therefore, the wear on both the surface of the disk and the brushes is substantial.

In the prior art, encoder brushes have had one of two different shapes. One type of encoder brush has a circular shape at the point of contact with the encoder disk so that as the brush wears away the effect is to gradually increase the contact area of the brush, thereby causing the characteristics of the brush to change and eventually result in a switching failure. The other type of prior art brush is L shaped and has a narrow arm which is positioned perpendicular to the surface of the encoder disk and contacts the disk at one end. The arm of this type of brush must be relatively long if it is to have a reasonably long period of life since the brush will wear down rapidly. However, since the drum is rotating, it will exert a drag on the end of the arm which is in contact with the drum, thereby displacing the brush a distance which is proportional to the length of the brush and the speed of the disk. Hence, the position of the brush on the encoder disk cannot be determined with precision and thereby the accuracy of the encoder disk will be adversely affected.

A second disadvantage of prior art brush encoders is that no simple and economical method exists for adjusting the position of the brushes with respect to the encoder disk after the brushes have been affixed to the encoder. As a substitute for adjustable brushes the common practice in the prior art is to assemble the brushes with the aid of an expensive forming die of high order precision. However, it has been found that even with this forming die it is often necessary to make adjustments in the positions of the brushes during final assembly of the encoder. Recently, a few of the better prior art encoders have been fabricated with adjustable brushes despite the fact that the apparatus available for adjustably mounting the brushes is expensive and sizable. For example, relatively large screw fixtures, lever fixtures and jigs of various sorts have been used in prior art encoders as mechanisms for adjustably mounting the brushes.

Still another limitation of prior art contact brush encoders, as hereinbefore mentioned, is that prior art encoders are sizable. When it is realized that a substantial number of encoders are used in an airborne guidance system, for example, it will be appreciated that the accumulative size of the encoders is substantial and in airborne applications, especially, it is of the utmost importance to keep size at a minimum.

It is evident from the foregoing discussion, that prior art contact brush encoders have a relatively short life due to the excessive wear of the contact brush. Furthermore, the accuracy of the encoders is limited by misalignment of the encoder disk shafts and the nature of the brushes. In addition, prior art contact brush encoders are relatively large. Still another disadvantage of prior art contact brush encoders is that they are difficult to fabricate, and therefore expensive.

The present invention provides, on the other hand, a highly accurate relatively long life contact brush encoder whose size is substantially reduced in comparison to the prior art encoders and which is easily fabricated and thus inexpensive to manufacture. In accordance with one of the basic concepts of the invention, a relatively small and lightweight contact brush is provided which is adjustably mounted to a brush block assembly so that the brush can be easily adjusted to any one of a plurality of positions after assembly. Since the brush is extremely light, it can be held against the surface of the encoder disk with a minimum of force without fear that the brush will bounce off the surface of the disk. Furthermore, since a minimum of force is used to maintain the contact brush in contact with the encoder disk, wear on both the encoder disk and the contact brush will be substantially reduced.

According to another concept of the invention, a contact brush is provided having a relatively short arm, the arm being perpendicular to the encoder disk surface whereby inaccuracy in contact brush positioning due to the drag of the rotating disk is minimized. According to still another concept of the invention, the arm of the contact brush comprises a grain oriented material, the grain being oriented along the longitudinal axis of the arm so that the arm is resistant to wear and will maintain a constant cross-sectional area.

According to still another concept of the invention, a coupling device is provided which permits input shaft and encoder shaft to be slightly misaligned without introducing any angular error into the encoder disk position and without causing compact gearing trains to bind. In accordance with another concept of the invention, a planetary differential gear train is provided for driving two encoder disks at different speeds. The planetary differential gear train is operable for rotating one disk at a speed many times the speed of rotation of the other disk and yet occupies only a small portion of the space required by prior art input gearing mechanisms.

In one embodiment of the invention, the contact brush analog-to-digital rotational encoder is operable for converting an analog signal to an 8 digit binary number. In this embodiment of the invention, a bifurcated brush weighing less than 1/10th that of prior art contact brushes and having a two-ended hair-pin shaped portion and a contact portion including two arms which extend from the two ends of the hair-pin shaped portion. The hair-pin shaped portion is adjustably positioned in a cylindrical tube having an inside diameter that is less than the width of the hair-pin shaped portion so that the hair-pin shaped portion is compressed in the cylindrical tube and thereby locks itself in position.

In a second embodiment of the invention, a contact brush analog-to-digital rotational encoder is provided which is operable to convert an analog shaft rotation to a 13 digit binary number. In this embodiment of the invention, a brush assembly is provided which is similar to that described in connection with the first embodiment of the invention. In addition, two disks mounted on different shafts are utilized, one disk having eight annular rings thereon for representing the eight least significant digits of the digital number to be generated, the other disk having five annular rings thereon for representing the remaining five digits of the number. A planetary differential gear train is provided for driving the encoder disk representing the five most significant digits at a speed which is 1/32nd the speed of rotation of the other encoder disk. The planetary differential gear train is coupled to the encoder disk shafts by means of coupling devices which compensate for minor misalignment between the gear train shaft and the encoder disk shafts so that no angular rotational error results in the position of the two encoder disks and so that the gear train will not bind and thereby be damaged.

The nature of the gear train of this embodiment along with the nature of the contact brushes and brush assembly of the present embodiment permit this embodiment of the invention to be placed in a housing which is substantially smaller than any equivalent type of encoder known in the prior art. Furthermore, an encoder mechanized in accordance with the teachings of the invention can be easily fabricated at a minimum of expense.

Therefore, it is an object of the present invention to provide a contact rotational encoder which includes a bifurcated contact brush which has a hair-pin shaped portion and a contact portion.

It is another object of the invention to provide a rotational analog-to-digital converter which includes a lightweight contact brush which is adjustably mounted in a hollow cylindrical tube.

It is still another object of the invention to provide a contact brush encoder which includes a contact brush having a relatively long life and whose diameter remains unchanged throughout the brush's life.

It is a further object of the invention to provide a rotational encoder which includes a planetary gear train for gearing down an encoder disk.

It is a still further object of the invention to provide a rotational encoder which includes a coupler for intercoupling a shaft to an encoder disk shaft so that any small misalignment between the axes of the two shafts does not result in an error in the angular position of the encoder shaft.

It is still another further object of the invention to provide a highly accurate encoder having a relatively long life and which is easy to fabricate, and thereby is inexpensive to manufacture.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

FIGURE 1 is a view of an assembled analog-to-digital converter in accordance with the invention.

FIGURE 2 is a side view of the converter shown in FIGURE 1.

FIGURE 3 is an isometric view of a brush block and an encoder disk of the converter shown in FIG. 2.

FIGURE 4 is a detailed side view of the brush block shown in FIGURE 3.

FIGURES 5a–5c are views of a bifurcated brush and a hollow cylindrical tube of the invention.

FIGURE 6 is a side view of another embodiment of an analog-to-digital converter, in accordance with the invention.

FIGURE 7 is an isometric view of a coupling device of the invention.

Referring now to the drawings, wherein like or corresponding parts are designated by the same reference character throughout the several views, there is shown in FIG. 1 a view of an assembled analog-to-digital converter 10, according to the present invention, which is operable for converting an analog signal which is a function of the position of a shaft 11 to an 8-digit binary number. Analog-to-digital converter 10 generates 8 electrical signals whose voltage magnitudes are indicative of the value of the 8 digits of the binary number, respectively. As indicated in FIG. 1, the 8 electrical signals representative of the 8 binary digits are produced on 8 separate conductors, respectively, so that the digital number can be readily applied to a digital computer or other apparatus by simply connecting the conductors thereto. To better understand the manner in which converter 10 converts the angle of shaft rotation of shaft 11 to a digital number, attention is directed to FIG. 2 wherein there is shown a side view of converter 10 having a portion of the outside housing of the converter removed so that the inner structure of the converter can be seen.

Referring now to FIG. 2, it is apparent that converter 10 includes the following basic elements: a housing 12, shaft 11, a pair of bearings 14, an encoder disk 16, a brush block 18, a plurality of hollow cylindrical tubes 20 affixed to brush block 18, a plurality of bifurcated brushes 22 mounted in cylindrical tubes 20, a diode package 24 containing a plurality of diodes, a plurality of internal coupling conductors 28 connecting bifurcated brushes 22 and diode package 24, and a plurality of external coupling conductors 30 coupled to diode package 24.

Referring now in detail to the rotating elements of encoder 10, it is evident from FIG. 2 that shaft 11 is supported by bearings 14. It should be noted that shaft 11 could be supported by a single bearing, but it has been found preferable to utilize a pair of bearings since the use of a pair of bearings reduces the possibility of any shaft misalignment. As shown in FIG. 2, encoder disk 16 is concentrically affixed to shaft 11 for rotation therewith. Referring to FIG. 3, wherein there is shown a view of the surface of encoder disk 16, it can be seen that encoder disk 16 has 8 angular or concentric rings thereon which are electrically conductive or non-conductive. As shown in FIG. 3, the darker areas represent the conductive areas while the lighter areas represent the non-conductive areas. In addition, a 9th innermost annular or concentric ring 32 is provided on the surface of encoder disk 16 whose total area is electrically conductive.

The outer-most annular ring on encoder disk 16 represents the least significant, or the "ones" digit of the binary number system, and the width of each electrically conductive area represents an increment associated with the least significant digit. The ring adjacent the outer-most ring represents the next significant or "twos" digit of the system. Similarly, the remaining 8 annular rings represent the "fours" digit, "eights" digit, "sixteens" digit, "32's" digit, "64's" digit and "128's" digit, of the binary number. It is thus apparent that the highest number that can be read from encoder disk 16 is 256. As is hereinafter explained, annular ring 32 does not represent any particular digit of the binary number but is a common or wiper ring since any point within the area of ring 32 is electrically connected by a conductive path on the encoder disk to each of the conductive areas within the eight annular rings representative of digit values.

Referring again to FIG. 3, wherein there is shown an exploded view of the assembly of encoder disk 16 and brush block 18, it is evident that one bifurcated brush 22 contacts the outer-most or "ones" digit ring while two bifurcated brushes 22 contact each of the remaining seven annular rings representative of binary digits. As shown in FIG. 3, one bifurcated brush is in contact with common or wiper angular ring 32. It is evident from an examination of FIG. 3 that the bifurcated brushes 22 are positioned in a pattern which has the form of a V with the apex of the V located near the center of encoder disk 16. The use of multiple brushes is desirable since the errors that might develop because of brush misalignment at area boundaries can be avoided by their use. Since both brush misalignment errors and the V-scan method of avoiding such errors are well known to one skilled in the art no further discussion of the subject is warranted herein. However, a detailed discussion of both the problem and the V-scan method of avoidance along with several other solutions to the problem are thoroughly discussed at pages 467 through 477 of "Digital Computer Components and Circuits," by R. K. Richards, published in 1957, by D. Van Nostrand Co., Inc.

Referring now to FIG. 4, there is shown a partly broken detailed side view of brush block 18. As shown in FIG. 4, a side 34 of brush block 18 has 8 cylindrical tubes 20 embedded therein and extending out therefrom. Each of these cylindrical tubes is connected to a corresponding cylindrical terminal which extends out of a recessed side portion 36 of brush block 18 by a conductive material, such as copper wire. It is clear that a bifurcated brush 22 mounted in the outer-most cylindrical tube 20 will contact the outer-most or "ones" digit ring. Furthermore, it is clear that each of the other seven brushes mounted in side 34 will contact one of the remaining annular rings representative of digit values.

As shown in FIG. 3, a side 38 of brush block 18 has eight cylindrical tubes mounted therein so that in assembly the inner-most cylindrical tube will be directly over common ring 32 and the remaining seven rings will be directly over the seven most significant digit rings, respectively. Therefore, if one bifurcated brush 22 is mounted in each of the cylindrical tubes the brush mounted in the inner most cylindrical tube on side 38 will contact common ring 32 and the other seven brushes will contact the seven most significant digit rings, respectively. As is indicated in FIG. 4, each of the cylindrical tubes mounted in side 38 of brush block 18 is electrically coupled to a cylindrical terminal mounted in a recessed side portion 39 by an electrical conductor, such as copper wire.

One suitable method for fabricating brush block 18, as described herein, is to use a die or mold which will properly position the cylindrical tubes and electrical conductors and then fill the mold with an epoxy resin. It will be obvious, however, to one skilled in the art that brush block 18 can be mechanized in a number of ways which differ substantially from that described herein. For example, the body of the brush block can be made from an epoxy resin glass laminate having one surface which is copper plated. The electrical conductors hereinbefore described can then be formed by etching the undesired copper from the surface of the block. The cylindrical tubes can then be soldered to the etched conductors and the brush block is completely assembled. Hence, it is to be expressly understood that the scope of the invention is not to be limited by the specific structure of the brush block herein described.

Referring now to FIGS. 5a–5c, there is shown in FIG. 5a a view of bifurcated brush 22, in FIG. 5b a view of hollow cylindrical tube 20 and in FIG. 5c an assembled view of bifurcated brush 22 mounted within cylindrical tube 20. As shown in FIG. 5a, the bifurcated brush 22 includes a 2 ended hair-pin shaped portion 40 and a pair of contact portions 42 extending from the ends of hair-pin shaped portion 40, the contact portions being substantially parallel and defining a plane which is substantially orthogonal with hair-pin shaped portion 40. As shown in FIGS. 5a and 5b, hair-pin shaped portion 40 is substantially wider than the inside diameter of cylindrical tube 20; therefore, in order to mount the brush in the cylindrical tube the hair-pin shaped portion must be compressed and remain compressed as long as any substantial portion of the brush remains mounted within cylindrical tube 20. Hence, a force will be exerted by the two sides of hair-pin shaped portion 40 against the inside walls of cylindrical tube 20. The frictional force generated as a result of the force exerted on the walls of the cylindrical tube will insure that the bifurcated brush will not change position with respect to the cylindrical tube as a result of any forces encountered by contact portions 42 of the brush in the normal operation of the encoder. This is true since any acceleration imparted to brush 22 by the rotational drag of the encoder disk generates a force which is many times smaller than the force holding the brush in position since the mass of brush 22 is exceedingly small. Hence, it is evident that minor adjustments in the position of brush 22 can easily be made by inserting the brush further into the cylindrical tube or by extending the brush further out of the cylindrical tube and yet there is no fear that during the course of operation of the encoder, the brush will move from the predetermined position.

Referring now in detail to the positioning of brushes 22 with respect to encoder disk 16, it will be apparent to those skilled in the art that the positioning of brushes 22 is determined by the arrangement of the conductive and non-conductive areas or, in other words, the logic scheme of the encoder disk. There is shown in FIG. 3 one logic scheme and brush position pattern which is suitable for use with the present invention. However, numerous other brush patterns can be used by modification of the logical scheme of the encoder disk. Therefore, it is to be herein specifically noted that the invention is not limited to the particular brush pattern or encoder disc logic herein described. As shown in FIG. 3, a radially oriented predetermined reference line 44 indicates the binary zero position of the logical pattern of encoder disk 16.

Referring now to the brush pattern shown in FIG. 3, when the rotational angle of shaft 11 is such that a zero value digital number should be generated the encoder brushes have the following positions. The "ones" digit brush should be positioned such that the bottom of contact portions 42 contact the encoder disk at a point just clockwise of the eighth conductive area from the predetermined reference line 44, in the clockwise direction. More particularly, the brush is positioned close to the eighth conductive area but not in contact therewith.

One of the brushes in contact with the "twos" digit annular ring is positioned between the fourth and fifth conductive areas from predetermined reference line 44 in the clockwise direction and within the quarter of the non-conductive area which is adjacent the fourth conductive area. The other brush in contact with the "twos" digit annular ring is to be centered within the fifth conductive area from predetermined reference line 44 in the counter-clockwise direction. As shown in FIG. 3, one of the two brushes contacting the "fours" digit annular ring is positioned between the second and third conductive areas from predetermined reference line 44 in the clockwise direction and one quarter of the distance between the two conductive areas from the second conductive area. The other brush in contact with the "fours" digit annular ring is centered within the third conductive area from reference line 44 in the counter clockwise direction.

One of the two brushes in contact with the "eighths" digit annular ring is positioned between the first and second conductive areas from predetermined reference line 44 in the clockwise direction and one quarter the distance therebetween from the first conductive area. The other of the two brushes is positioned in the center of the second conductive area in the counter-clockwise direction from predetermined reference line 44. The first of the two brushes in contact with the "sixteens" digit annular ring is positioned between the first and second conductive areas from pre-determined reference line 44 and one quarter of a distance therebetween from the first conductive area. The other of the two brushes is positioned at the center of the first conductive area from predetermined reference line 44 in the counter-clockwise direction.

As shown in FIG. 3, one of each of the two brushes in contact with the three most significant annular rings is positioned along a radial line which is coincident with the boundary of the first non-conductive area and the first conductive area in the clockwise direction from predetermined reference line 44 on the "eighths" digit annular ring. The other brush of each of the three pairs of brushes contacts the encoder disk at a point which is coincident with a radially oriented line which passes through the boundary within the "eighths" digit annular ring of the first non-conductive area and the first conductive area from predetermined reference line 44 in the counter-clockwise direction. It should be herein specifically noted that the positioning of the brushes associated with the three most significant annular rings is not critical. Hence, the position of the brushes may be varied considerably from that herein described without adversely affecting the operation of the encoder.

Referring again to FIG. 2, one end of each of the plurality of internal coupling conductors 28 is connected to a corresponding one of the plurality of cylindrical terminals, respectively, extending from the recessed portions 36 and 38 of brush block 18. The other end of each of the conductors is connected to the cathode electrode of a corresponding one of the plurality of diodes, respectively, not shown, contained with diode package 24. The anode electrodes of the plurality of diodes contained within diode package 24 are connected to the corresponding plurality of external coupling conductors 30, respectively, which extend out the rear of encoder 10. Hence, by application of a voltage potential to the external coupling conductor indirectly coupled to the contact brush contacting common ring 32 of encoder disk 16, a voltage potential will be generated on the external conductors which are connected to the brushes in contact with a conductive area on the encoder disk.

It can be shown that when encoder 10 is utilized with any of the numerous types of decision making circuits available, a unique logical pattern of potential voltage will be generated for each increment of rotational angle of shaft 11.

Referring to a Table A, presented hereinbelow, there is represented the logical pattern of potential voltages generated for the first eight increments of rotation from predetermined reference line 44. As indicated in Table A, the presence of a voltage potential is represented by the numerical character 1 and the absence of the voltage potential is represented by the numerical character 0. It is apparent from examination of Table A that binary numbers having the values of 1 through 8 are generated when the rotatable shaft is rotated to incremental positions one through eight, respectively. It can be shown that a binary number is generated which represents in a similar fashion the remaining 248 of the 256 incremental positions of the rotatable shaft.

*Table A*

| Rotational Angle Increments | "1's" digit | "2's" digit | "4's" digit | "8's" digit | "16's" digit | "32's" digit | "64's" digit | "128's" digit |
|---|---|---|---|---|---|---|---|---|
| 0 | 0 | 0 | 0 | 0 | 0 | 0 | 0 | 0 |
| 1 | 1 | 0 | 0 | 0 | 0 | 0 | 0 | 0 |
| 2 | 0 | 1 | 0 | 0 | 0 | 0 | 0 | 0 |
| 3 | 1 | 1 | 0 | 0 | 0 | 0 | 0 | 0 |
| 4 | 0 | 0 | 1 | 0 | 0 | 0 | 0 | 0 |
| 5 | 1 | 0 | 1 | 0 | 0 | 0 | 0 | 0 |
| 6 | 0 | 1 | 1 | 0 | 0 | 0 | 0 | 0 |
| 7 | 1 | 1 | 1 | 0 | 0 | 0 | 0 | 0 |
| 8 | 0 | 0 | 0 | 1 | 0 | 0 | 0 | 0 |

It is clear from the foregoing, that encoder 10 is responsive to rotation of shaft 11 to generate an 8 digit binary number whose magnitude is a function of the angle of shaft rotation. Furthermore, it is clear that changes in position of brushes 22 can be easily made during final assembly or inspection. Furthermore, the brushes can be so easily adjusted that it is feasible for them to be aligned in the field by relatively unskilled workers.

It should be noted that numerous modifications and alterations may be made in the embodiment of the invention herein described. For instance, the position of brushes 22 with respect to encoder disk 16 and the logical pattern on the encoder disk itself can be altered in numerous different ways. As a further example, more than one encoder disk may be utilized in the construction of encoder 10, as is hereinafter more fully described.

Referring now to FIG. 6, there is shown an encoder 10 utilizing two encoder disks which are coupled to shaft 11 for rotation therewith to generate a 13 digit binary number whose magnitude is a function of the rotational angle of shaft 11. As shown in FIG. 6, encoder disk 16a is directly coupled to shaft 11 and is rotatable therewith at the same speed. However, rotatable disk 16b is coupled to shaft 11 by means of a planetary differential gear train 46 and a coupling device 47. The planetary gear train is operable for gearing down encoder disk 16b so that it rotates at a speed which is a fraction of the rotational speed of shaft 11. Coupling device 47 is utilized to intercouple shaft 11 to planetary gear train 46.

Encoder disks 16a and 16b have the same logical pattern thereon as is utilized in the encoder hereinbefore described. The eight least significant digits of the 13-digit binary number are generated with encoder disk 16a in the same manner as was herein described in connection with the 8 digit encoder. The three outer most annular rings on encoder disk 16a are not utilized while the remaining five annular rings representative of digits are used to generate the five most significant digits of the 13 digit binary number, significance of the digit being related to the radius of the annular ring. For example, the inner-most of the angular rings or, in other words, the annular rings having the smallest radius is used to generate the most significant digit of the binary number.

As shown in FIG. 6, the mechanization of brush block assemblies 18a and 18b are so similar to the brush block assembly used in connection with the first embodiment of the invention that a further discussion of brush block assemblies 18a and 18b is unnecessary. As hereinbefore described in connection with the 8 digit embodiment of the invention, internal coupling conductors 28 couple the plurality of brushes 22 to the cathode electrodes of the corresponding plurality of isolating diodes, respectively, within diode package 24. The anode electrodes of the plurality of isolating diodes are coupled in turn to a corresponding plurality of external coupling conductors 30, respectively, which are used for applying the signals generated by brushes 22 to a decision making circuit which is operable for generating the 13 digits of the binary number.

Referring now with particularity to planetary differential gear train 46, it is apparent that the planetary gear train comprises a gear train housing 49, a driven gear 48, a driving gear 50, a planetary gear 52, a planetary gear output shaft 54, and a hollow input shaft 60. As shown in FIG. 6, driven gear 48 and driving gear 50 are coaxially positioned adjacent one another and driving gear 50 is affixed to gear train housing 49 so that it is stationary. As shown in FIG. 6, driven gear 48 is concentrically coupled to encoder disk 16b by output shaft 54. Planetary gear 52 meshes with both driven gear 48 and driving gear 50 and is coupled to hollow input shaft 60, the hollow input shaft being coaxial with output shaft 54. When it is realized that driving gear 50 has 32 teeth and driven gear 48 has 33 teeth it is clear that the driven gear will make one revolution every 32 revolutions of hollow shaft 60. Hence, encoder disk 16b makes one revolution for every 32 revolutions of the encoder disk 16a and encoder shaft 11.

As shown in FIG. 6, hollow shaft 60 is coupled to shaft 11 by means of a coupling device 47 which is operable to intercouple the two shafts without introducing any angular error into the position of planetary gear 52 even though shaft 11 is misaligned with respect to hollow shaft 58. Furthermore, coupling device 47 compensates for misalignment of shaft 11 in such a manner that no forces are applied to hollow shaft 60 which tend to misalign it with respect to planetary gear output shaft 54 and thereby cause planetary gear 52 to improperly mesh with driven gear 48 and driving gear 50. It is clear, of course, that if the planetary gear 52 does not properly mesh with the driving gear and the driven gear that the gear train will bind and the driven and driving gears may be changed.

Referring now to FIG. 7, there is shown an exploded view of coupling device 47. As shown in FIG. 7, shaft 11 has a cylindrical portion 62 affixed to one end which is coaxial with the main portion of shaft 11 and whose radius is substantially less than the main portion of the shaft. Cylindrical portion 62 has a radially oriented slot therein in which there is inserted the center portion of a leaf spring 64 whose diameter is substantially equal with the diameter of hollow shaft 60. As shown in FIG. 7, hollow shaft 60 contains diametrically disposed slots 66 at the end of the shaft.

In assembly, the two ends of the springs 64 fit into the two slots 66, respectively, in hollow shaft 60 while the center potion of the spring 64 is inserted in the slot of cylindrical portion 62. When it is noted that cylindrical portion 62 is free to slide across the center portion of leaf spring 64 and that the leaf spring is flexible it is easily seen that if shaft 11 were slightly misaligned with respect to hollow shaft 60 that leaf spring 64 can bend enough to compensate for misalignment in one plane while the center portion of the leaf spring can slide through the slot in cylindrical portion 62 enough to compensate for slight misalignment in the plane perpendicular thereto. Hence, a planetary differential gear can be utilized in an encoder without fear that slight misalignment of the input shafts will damage the gear train and introduce an error in the binary number.

It should be noted that by utilization of the teachings of the invention a relatively small encoder can be mechanized which is capable of converting a shaft position into a 13 digit binary number. To more vividly describe the reduction in size accomplished by the teachings of the invention it should be noted that an analog-to-digital converter for converting a shaft position into an eight digit binary number has been mechanized, as described herein, which has a diameter of a little over 1 inch and a length of an inch and a quarter. An analog-to-digital converter for converting a shaft position into a 13 digit binary number has been mechanized, as herein described, which has a diameter of a little over one inch and a length which is a little under 2 inches. It will be apparent to one skilled in the art that the encoders herein described are substantially smaller than any equivalent encoder known in the prior art. Furthermore, the life expectancy of encoders mechanized in accordance with the teachings of the invention is far greater than the life expectancy of prior art encoders.

It is to be expressly understood, of course, that the basic concepts herein taught can be embodied in different structures from the specific structure shown without departing from the spirit and scope of the invention. For example, the diode package 24, as shown in FIGS. 2 and 6, can be eliminated from the encoder assembly thereby reducing the size of the encoder. The diodes can then be located in the decision making circuitry or eliminated completely. Accordingly, it is to be understood that the spirit and scope of the invention is to be limited only by the scope of the appended claims.

What is claimed as new is:

1. In a rotational analogue-to-digital converter of the contact brush type operable while experiencing applied acceleration within a predefined range, the combination comprising an encoder disk having conductive and non-conductive areas thereon; a cylindrical tube having a predetermined inside diameter positioned adjacent said disk; and a brush including a two ended hair-pin shaped portion and a contact portion extending from one of the two ends of said hair-pin shaped portion, said contact portion being at a predetermined angle with respect to said hair-pin shaped portion, and contacting said encoder disk, said hair-pin shaped portion when unrestrained being substantially wider at one point than the predetermined inside diameter of said cylindrical tube, said hair-pin shaped portion of said brush being adjustably positioned within and compressed by said cylindrical tube for exerting spring forces against said tube to hold said brush in said tube, the spring forces being sufficient to solely hold said brush in position relative to said tube regardless of the application of acceleration to the converter within the predefined range and compressed to restrain said brush from movement and to allow said brush to be locked in a plurality of selected positions.

2. A contact rotational analogue-to-digital converter capable of operating under the application of acceleration forces within a predefined range for indicating the rotational angle of an input shaft in the form of a plurality of electrical signals which are representative of a digital number having a plurality of digits, said converter comprising: a first rotatable disk having a plurality of spaced annular rings, each of said rings including areas electrically conductive; a second rotatable disk having a plurality of spaced annular rings each of said rings including areas electrically conductive; a planetary gear train including a driving gear, a driven gear, and a planetary gear; first mechanical coupling means for coupling said first disk and said planetary gear to the input shaft for rotating the input shaft and said planetary gear therewith; second mechanical coupling means for coupling said second disk to said driven gear for rotating said second disk therewith; a plurality of cylindrical tubes; a corresponding plurality of electrical conductors for conducting the electrical signals representative of the plurality of digits of the digital number; third coupling means for coupling each one of said cylindrical tubes to a corresponding one of said electrical conductors; mounting means for mounting one or more of said cylindrical tubes adjacent different ones of said annular rings; and a plurality of bifurcated brushes corresponding to said plurality of cylindrical tubes, each of said bifurcated brushes being made from a piece of resilient wire bent at its middle point to have a two ended hair-pin shaped portion, the two ends of said hair-pin shaped portion being bent to form a pair of contact portions, each contact portion having a butt end, said pair of contact portions being substantially parallel and defining a plane substantially orthogonal to said hair-pin shaped portion, said hair-pin shaped portion of said plurality of bifurcated brushes being compressed by and adjustably positioned in the corresponding plurality of cylindrical tubes with said butt end of said bifurcated brush contacting said annular ring adjacent said cylindrical tube in which said bifurcated brush is positioned, said brushes exerting spring forces on the inside surface of said cylindrical tubes sufficient to maintain said brush stationary relative to said tubes within the predefined range of applied accelerations.

3. A contact rotational encoder capable of operating while under the influence of a predefined range of accelerational forces for indicating the rotational angle of a shaft with respect to a predetermined reference line, the angle being represented by a plurality of electrical signals which are indicative of the value of a binary number having a plurality of digits, said encoder comprising: a rotatable disk having a plurality of spaced annular rings established thereon for representing the plurality of digits, respectively, of the binary number, each of said rings including areas electrically conductive; a plurality of bifurcated brushes corresponding to said plurality of spaced annular rings, each of said brushes including a two ended hair-pin shaped portion and a pair of contact portions extending from the ends of said hair-pin shaped portion, said pair of contact portions defining a plane at a predetermined angle other than zero with said hair-pin shaped portion; brush positioning means for adjustably positioning said plurality of bifurcated brushes adjacent said corresponding spaced annular rings, the contact portions of said brushes contacting said encoder disk, said brush positioning means including a plurality of cylindrical tubes positioned adjacent said rotatable disk and having a predetermined inside diameter, said brush positioning means also including a corresponding plurality of conductors, each of said cylindrical tubes being connected to a corresponding one of said conductors, said hair-pin shaped portions of said brushes being adjustably positioned in corresponding cylindrical tubes, the width of said hair-pin shaped portions being greater than said predetermined inside diameter to compress said hair-pin shaped portions to exert spring forces on said tubes, said spring forces being sufficient to overcome the predefined range of accelerational forces whereby said brush is adjustably positioned in any one of a plurality of positions; mechanical coupling means for coupling said disk to the shaft to rotate said disk therewith; a source of potential; and electrical coupling means for electrically coupling said conductive areas of said disk to said source of potential whereby electrical current flows between the ends of any one of said brushes and said disk whenever the ends of any one of said brushes contacts the electrically conductive areas of said disk.

References Cited in the file of this patent

UNITED STATES PATENTS

| | | |
|---|---|---|
| 2,192,421 | Wallace | Mar. 5, 1940 |
| 2,719,290 | Bland | Sept. 27, 1955 |
| 2,749,538 | Cooper et al. | June 5, 1956 |
| 2,787,771 | Francis | Apr. 2, 1957 |
| 2,796,566 | Maynard et al. | June 18, 1957 |
| 2,879,491 | Shapiro | Mar. 24, 1959 |